Jan. 17, 1928.

L. B. LEMAIRE 1,656,440

SINKER AND BAIT FASTENER

Filed Nov. 15, 1924

INVENTOR.

Louis B. Lemaire

BY
*Thos. J. Donnelly*
ATTORNEY.

Patented Jan. 17, 1928.

1,656,440

UNITED STATES PATENT OFFICE.

LOUIS B. LEMAIRE, OF DETROIT, MICHIGAN, ASSIGNOR TO THE ENTERPRISE MANUFACTURING COMPANY, OF AKRON, OHIO, A CORPORATION OF OHIO.

SINKER AND BAIT FASTENER.

Application filed November 15, 1924. Serial No. 750,221.

My invention relates to a new and useful improvement in a sinker and bait fastener, and has for its object the provision of a sinker used on fishing lines so constructed and arranged, that the sinker and bait will be, under normal conditions, in longitudinal alinement with each other.

Another object of the invention is the provision in combination with a sinker having means for attaching a line thereto, of bait carrying means adapted to be locked in position to prevent the removal of the bait therefrom, and so constructed and arranged as to permit the easy and quick removal or placement of bait therefrom or thereon.

Another object of the invention is the provision in combination with a sinker adapted for attachment to a fish line, or the like, of a bait securing means, so arranged as to lock the bait securely thereon, when moved in one position, and to permit the ready removal therefrom or placement thereon, when moved to another position, the device being provided with means for locking the attachment means in operative position, after the bait has been placed thereon.

Other objects will appear hereinafter.

The invention consists in the combination and arrangement of parts hereinafter described and claimed.

Figure 1:
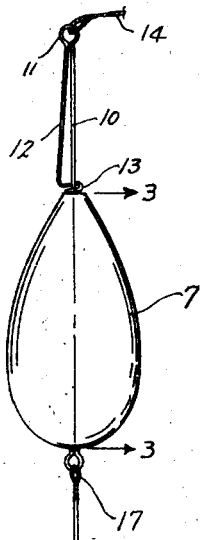
Figure 2:
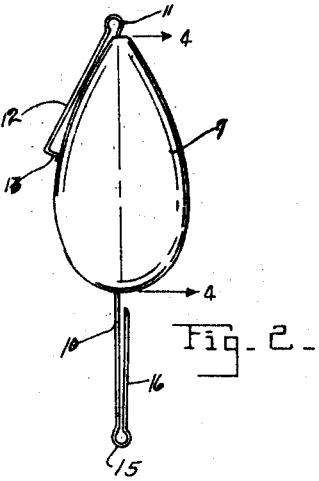
Figure 3:
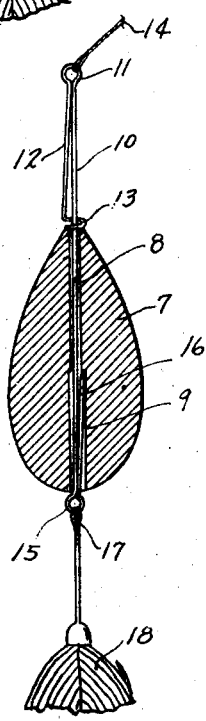
Figure 4:
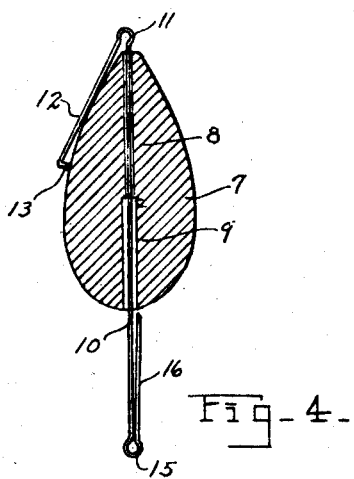

The invention will be best understood from a reference to the accompanying drawings which form a part of this specification, and in which, Fig. 1 is a side elevational view of the invention, Fig. 2 is a side elevational view of the invention showing the bait attaching means moved to the position for placing the bait thereon, Fig. 3 is a sectional view taken on substantially line 3—3 of Fig. 1, Fig. 4 is a sectional view taken on substantially line 4—4 of Fig. 2.

The invention, in its preferred form, comprises a sinker 7, made from lead, or other suitable material, of a size desired for the purposes for which it is to be used. This sinker 7 is provided with a bore 8, which terminates in an enlarged bore 9, projected centrally through the body of the sinker. The bore 8 is of such diameter as to snugly accommodate the wire 10, which is bent to form an eyelet 11 and provided with a doubled over shank 12, terminating in a U-shaped portion 13, adapted for embracing the main body of the wire 10, the eyelet affording a means for attaching the fish line 14 thereto. The lower end of the wire 10 is turned to provide an eyelet 15 and the doubled over shank 16. The enlarged bore 9 is provided for the snug reception of the shank 16 and the wire 10. The eyelet 15 is adapted for the reception of an eyelet 17, to which the artificial bait 18 is secured.

In order to attach the bait on the eyelet 15, the U 13 is removed from around the wire 10 and the wire 10 is thrust downwardly into the position shown in Fig. 2. The eyelet 17 may then be threaded upon the shank 16 and passed downwardly to the eyelet 15, whereupon the shank 16 is thrust inwardly of the sinker 7 as shown in Figs. 1 and 3. The U-shaped member 13 is then brought into embracing relation with the wire 10 and serves to engage the end of the sinker 7, so as to prevent longitudinal movement of the wire 10 relatively to the sinker 7 in one direction, the shank 16 serving to engage the shoulder formed within the sinker to prevent longitudinal movement of the wire 10 in one direction. The eyelet 15 would also afford a means of preventing a movement of the wire 10 in one direction, so that the wire 10 is fixedly locked by these means in the sinker 7. It is thus seen that when the bait is placed on the eyelet 15, the same cannot be removed therefrom without unhooking the U-shaped member 13 from the wire 10 and moving the eyelet 15 downwardly, as shown in Figs. 2 and 4. It is also apparent that the artificial bait 18 may be very easily and entirely changed or removed from the eyelet 15, with the use of a sinker constructed in this manner.

As shown in Figs. 1 and 3, the bait 18 and the sinker 7 are in longitudinal alinement. In the present practice of attaching the bait and sinker to the fish line, the sinker is allowed to depend generally forwardly of the bait, which presents an unnatural appearance, with the result that the bait is less effective for its purpose. By arranging the bait and the sinker in longitudinal alinement, a more natural appearance is given to the bait with consequent reduction of wariness on the part of the fish. In addition to this feature, the sinker is preferably colored with some highly attractive color, such as red, in order to attract the fish. The sinker 7 may also be provided with a coat of luminous paint, so as to render it more easily visible under the water.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. In combination, a body having a through opening, one end of said opening being enlarged, a wire extending through said opening and having one end doubled upon itself and adapted for entering the enlarged end of said opening, the opposite end of said wire being doubled upon itself and being angularly turned and terminating exteriorly of said body for embracing the main portion of said wire and engaging one end of said body for locking said wire against movement longitudinally in said body in one direction, said doubled over portion in said enlarged opening being adapted for preventing the movement of said wire longitudinally in said body in the opposite direction.

2. A device of the character described, comprising a body having a through opening, a shaft adjustably mounted in said opening and having a loop at one end for receiving an attachment, said loop being adapted to normally engage said body so as to limit adjustment of said shaft in one direction, said shaft having its other end portion doubled back upon itself and adapted to receive an attachment, said doubled back portion being formed with a hook for engagement with said shaft at a point adjacent said body so as to prevent adjustment of said shaft in the other direction.

3. A device of the character described, comprising a body provided with a through opening, a shaft longitudinally adjustable in said opening and provided at one end with an attachment receiving loop and a free return end portion, and an abutment at an intermediate point in said opening and engageable by the free end portion of said shaft for limiting longitudinal adjustment of said shaft in said opening in one direction, said shaft being also provided at its other end with an attachment receiving loop and a free return end portion having a hook cooperating with said shaft and adapted to engage said body so as to limit longitudinal adjustment of said shaft in the other direction.

4. A device of the character described, comprising a body provided with a through opening, a shaft longitudinally and rotatably adjustable in said opening and provided at one end with at attachment receiving loop and a free return end portion, an annular abutment at an intermediate point in said opening and engageable by the free end portion of said shaft for limiting longitudinal adjustment of said shaft in said opening in one direction, said shaft being also provided at its other end with an attachment receiving loop and a free return end portion having a hook cooperating with said shaft and adapted to engage said body so as to limit longitudinal adjustment of said shaft in the other direction.

5. A device of the character described, comprising a body provided with a through opening, one end portion of said opening being enlarged to provide a shoulder at an intermediate point in said opening, a shaft longitudinally adjustable in said opening and provided at one end with an attachment receiving loop and a free return end portion, said return end portion being adapted to lie within said enlarged opening portion and to engage the shoulder of said opening, whereby longitudinal movement of said shaft is limited in one direction, said shaft being also provided at its other end with an attachment receiving loop and a free end portion having a hook cooperating with said shaft and adapted to engage said body to limit longitudinal adjustment of said shaft in the other direction.

6. A device of the character described, comprising a body having a through opening, a shaft extending through said opening and provided at each end with an attachment receiving loop and a single releasable means at one end portion of said shaft for normally maintaining both of said loops effectively closed and arranged upon release to permit either of said loops to be opened for removal of its attachment.

7. A device of the character described, comprising a body having a through opening, a shaft extending through said opening and provided at each end with an attachment receiving loop and a single releasable means carried by one end portion of said shaft for normally maintaining both of said loops effectively closed and arranged upon release to permit either of said loops to be opened for removal of its attachment.

8. A device of the character described, comprising a body having a through opening, a shaft extending through said opening and provided at each end with an attachment receiving loop and a single releasable means integral with one end portion of said shaft for normally maintaining both of said loops effectively closed and arranged upon release to permit either of said loops to be opened for removal of its attachment.

9. A device of the character described, comprising a body having a through opening, a shaft extending through said opening and provided at each end with an attachment receiving loop, and a single releasable hook means at one end portion of said shaft for normally maintaining both of said loops effectively closed and arranged upon release to permit either of said loops to be opened for removal of its attachment.

10. A device of the character described, comprising a body provided with a through opening, a shaft in said opening provided at one end with a primary open attachment receiving loop and adjustable in said opening to a position in which said primary loop is effectively closed by the body, said shaft being provided at its other end with an extension having a second attachment receiving loop and a return portion provided with a releasable hook adapted to engage said extension and effectively close the second loop and also engage the body to normally maintain said primary loop closed, said extension being of sufficient length that when said hook is released and the second loop opened to embrace the body, said shaft may be longitudinally adjusted in said opening to open said primary loop.

In testimony whereof, I have signed the foregoing specification.

LOUIS B. LEMAIRE.